United States Patent
Hu et al.

(10) Patent No.: US 10,288,749 B2
(45) Date of Patent: May 14, 2019

(54) PHOTON COLLIMATION APPARATUS, METHODS, AND SYSTEMS

(71) Applicant: Halliburton Energy Services, Inc., Houston, TX (US)

(72) Inventors: Yike Hu, Houston, TX (US); Dongwon Lee, Kingwood, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/518,240

(22) PCT Filed: Jun. 1, 2015

(86) PCT No.: PCT/US2015/033589
§ 371 (c)(1),
(2) Date: Apr. 10, 2017

(87) PCT Pub. No.: WO2016/076920
PCT Pub. Date: May 19, 2016

(65) Prior Publication Data
US 2017/0248733 A1    Aug. 31, 2017

Related U.S. Application Data

(63) Continuation-in-part of application No. PCT/US2014/064793, filed on Nov. 10, 2014.

(51) Int. Cl.
*G01T 1/20* (2006.01)
*G01V 5/12* (2006.01)
(Continued)

(52) U.S. Cl.
CPC .......... *G01T 1/2018* (2013.01); *G01T 1/1648* (2013.01); *G01V 5/12* (2013.01); *G21K 1/02* (2013.01)

(58) Field of Classification Search
CPC .................................. G01V 5/12; G21K 1/02
See application file for complete search history.

(56) References Cited

U.S. PATENT DOCUMENTS 3,543,384 A * 12/1970 Hansen .................... A61B 1/04
                                                                   250/363.1
4,054,800 A   10/1977 Leask
(Continued)

FOREIGN PATENT DOCUMENTS

WO    2010077626 A1    7/2010
WO    2012058564 A2    5/2012
(Continued)

OTHER PUBLICATIONS

"International Application Serial No. PCT/US2014/064793, International Search Report dated Aug. 7, 2015", 3 pages.
(Continued)

*Primary Examiner* — David P Porta
*Assistant Examiner* — Djura Malevic
(74) *Attorney, Agent, or Firm* — Gilliam IP PLLC (57) ABSTRACT

In some embodiments, an apparatus and a system, as well as a method and an article, may operate to receive photons at inner surfaces of an array of tubes forming a columnar structure, the tubes including a material with substantially high density, wherein longitudinal axes of the tubes are substantially parallel. Further activities include directing the photons within the columnar structure to a position-sensitive detector to measure the photons, wherein the position-sensitive detector is divided into an array of pixels, and wherein individual ones of the tubes in the array of tubes maintain a fixed mechanical arrangement with individual ones of the array of pixels, to provide collimation of the photons from a first end of the tubes to a second end of the
(Continued)

tubes coupled to the position-sensitive detector. Additional apparatus, systems, and methods are described.

20 Claims, 7 Drawing Sheets

(51) Int. Cl.
  *G21K 1/02* (2006.01)
  *G01T 1/164* (2006.01)

(56) References Cited

U.S. PATENT DOCUMENTS

| | | | | |
|---|---|---|---|---|
| 4,127,398 | A * | 11/1978 | Singer, Jr. | B01L 3/50857 |
| | | | | 156/296 |
| 4,597,096 | A * | 6/1986 | Larsson | G01T 1/1642 |
| | | | | 250/363.1 |
| 5,099,134 | A * | 3/1992 | Hase | G21K 1/025 |
| | | | | 250/363.1 |
| 6,678,352 | B1 * | 1/2004 | Kumakhov | G01N 23/04 |
| | | | | 378/154 |
| 6,734,430 | B2 * | 5/2004 | Soluri | G01T 1/202 |
| | | | | 250/363.1 |
| 6,980,629 | B1 | 12/2005 | Hoheisel et al. | |
| 6,993,110 | B2 * | 1/2006 | Hoffman | G21K 1/025 |
| | | | | 250/363.1 |
| 7,221,737 | B2 * | 5/2007 | Hoheisel | G21K 1/025 |
| | | | | 250/505.1 |
| 7,274,022 | B2 * | 9/2007 | Soluri | G01T 1/161 |
| | | | | 250/363.1 |
| 7,418,082 | B2 * | 8/2008 | Levene | G21K 1/025 |
| | | | | 378/147 |
| 7,633,058 | B2 | 12/2009 | Stoller et al. | |
| 7,707,854 | B2 * | 5/2010 | D'Urso | B82Y 20/00 |
| | | | | 65/31 |
| 7,730,748 | B2 * | 6/2010 | Haochuan | C03B 37/01214 |
| | | | | 65/393 |
| 7,915,590 | B2 * | 3/2011 | Starfield | G01T 1/295 |
| | | | | 250/363.02 |
| 8,330,113 | B2 * | 12/2012 | Kawaguchi | G21K 1/025 |
| | | | | 250/363.1 |
| 9,655,577 | B2 * | 5/2017 | Choi | A61B 6/025 |
| 9,903,962 | B2 * | 2/2018 | Kovalski | G01T 1/2985 |
| 2002/0020846 | A1 | 2/2002 | Pi et al. | |
| 2002/0175289 | A1 * | 11/2002 | Soluri | G01T 1/202 |
| | | | | 250/363.1 |
| 2002/0175290 | A1 * | 11/2002 | Soluri | G01T 1/161 |
| | | | | 250/366 |
| 2003/0076929 | A1 * | 4/2003 | Hoheisel | G21K 1/025 |
| | | | | 378/98.8 |
| 2004/0042585 | A1 * | 3/2004 | Nagarkar | G21K 4/00 |
| | | | | 378/98.8 |
| 2005/0017182 | A1 * | 1/2005 | Joung | G01T 1/1648 |
| | | | | 250/363.1 |
| 2005/0078798 | A1 * | 4/2005 | Jiang | C03B 37/01214 |
| | | | | 378/147 |
| 2005/0104000 | A1 * | 5/2005 | Kindem | G01T 1/1644 |
| | | | | 250/361 R |
| 2006/0039527 | A1 * | 2/2006 | Malamud | A61B 6/032 |
| | | | | 378/7 |
| 2006/0065836 | A1 * | 3/2006 | Tsuchiya | G01T 1/1648 |
| | | | | 250/363.1 |
| 2006/0108533 | A1 * | 5/2006 | McEvoy | G01T 1/20 |
| | | | | 250/367 |
| 2007/0025519 | A1 * | 2/2007 | Vogtmeier | G21K 1/02 |
| | | | | 378/149 |
| 2007/0060809 | A1 * | 3/2007 | Higgins | A61B 5/0075 |
| | | | | 600/328 |
| 2007/0081159 | A1 * | 4/2007 | Giffin | B01L 3/0275 |
| | | | | 356/319 |
| 2009/0101808 | A1 * | 4/2009 | Hassan | G01V 5/06 |
| | | | | 250/265 |
| 2009/0134334 | A1 * | 5/2009 | Nelson | G01T 1/2002 |
| | | | | 250/361 R |
| 2011/0026685 | A1 * | 2/2011 | Zilberstein | G01T 1/1611 |
| | | | | 378/197 |
| 2011/0029246 | A1 * | 2/2011 | Nikitin | G01V 5/04 |
| | | | | 702/8 |
| 2011/0063433 | A1 * | 3/2011 | Thonhauser | G01N 21/251 |
| | | | | 348/135 |
| 2012/0248320 | A1 * | 10/2012 | Wangerin | G01T 1/166 |
| | | | | 250/363.05 |
| 2013/0168567 | A1 * | 7/2013 | Wartski | G21K 1/025 |
| | | | | 250/394 |
| 2014/0037065 | A1 | 2/2014 | Botto | |
| 2014/0319330 | A1 | 10/2014 | Berheide et al. | |
| 2017/0045640 | A1 * | 2/2017 | Zhang | E21B 49/08 |
| 2017/0052280 | A1 * | 2/2017 | Zhang | E21B 49/08 |
| 2017/0218749 | A1 * | 8/2017 | Lee | E21B 44/005 |

FOREIGN PATENT DOCUMENTS

WO    2016053344 A1    4/2016
WO    2016076920 A2    5/2016

OTHER PUBLICATIONS

"International Application Serial No. PCT/US2014/064793, Written Opinion dated Aug. 7, 2015", 10 pages.
"International Application Serial No. PCT/US2015/033589, International Search Report dated Aug. 26, 2015", 3 pgs.
"International Application Serial No. PCT/US2015/033589, Written Opinion dated Aug. 26, 2015", 8 pgs.
European Application No. 15 858 901.0; Extended European Search Report; dated May 11, 2018, 8 pages.

\* cited by examiner

PHOTON COLLIMATION APPARATUS, METHODS, AND SYSTEMS

RELATED APPLICATIONS

This application claims priority to PCT Application Ser. No. PCT/US2014/064793, filed 10 Nov. 2014 (hereinafter the "Priority Application"), which Priority Application designated all PCT contracting states, and which Priority Application is incorporated herein by reference in its entirety. This application is related to PCT Application Ser. No. PCT/US2015/033579, titled "Energy Detection Apparatus, Systems, and Methods", filed on even date herewith.

BACKGROUND

Understanding the structure and properties of geological formations can reduce the cost of drilling wells for oil and gas exploration. Measurements made in a borehole (i.e., downhole measurements) are typically performed to attain this understanding, to identify the composition and distribution of material that surrounds the measurement device downhole.

For example, portions of the formation or cement surrounding a borehole may be imaged using various forms of energy, such as ultrasound, radio-frequency, or X-rays. Various devices may be used to obtain such images, with varying degrees of success.

DETAILED DESCRIPTION

In conventional downhole imaging devices that use a scintillation crystal to quantify energy measurements, an external collimator can be disposed to achieve position sensitivity with respect to photons that impinge on the crystal. A simple, cost-effective collimator assembly can be formed as a plurality of metal tubes, bonded together. The scintillator and collimator combination can be used in many applications, such as cement evaluation, downhole imaging, and formation density evaluation.

In some embodiments, the collimator may be assembled from a plurality of tubes of arbitrary shapes. If attention is paid to certain design principles, explained in the following paragraphs, the resulting collimator can be used for downhole imaging and formation evaluation over a wide range of particle energies, with different incident angles. Thus, in some embodiments, collimator designs can be customized based on specific testing requirements, beginning with the type of tubing. For example, some embodiments can be used to make collimators that align with a pixelated scintillator used in X-ray or gamma ray detection.

To provide a more consistent use of terminology throughout this document, specific terms and phrases are used. They are defined as follows:

housing means any one or more of a drill collar, a downhole tool, or a wireline logging tool body (all having an outer surface, to enclose or attach to sources, detectors, sensors, magnetometers, fluid sampling devices, pressure measurement devices, temperature measurement devices, transmitters, receivers, acquisition and processing logic, and data acquisition systems, among others).

image, when used as a noun, means a collection of pixel data that can be processed to form a human-readable representation of a thing, such as a formation; when used as a verb, this terms refers to the activity of sensing, over a set of elements, the relative amount of energy (e.g., photons) directed to those elements according to their location with respect to the surrounding environment.

A tube is an object that is longer than it is wide, with a hollow central portion that follows the longitudinal axis of the object. Specific examples of a tube include a hollow cylinder, rectangular or square conduit, and piping, among others.

An array of tubes maintains a fixed mechanical arrangement with a pixelated detector when the physical orientation and distance between tubes in the array and one or more pixels in the detector does not vary to any substantial degree.

Preventing photon leakage within an array of tubes that form a collimator means that the quantity of photons entering one tube, and propagating through the wall of that tube into the walls of adjacent tubes, is less than some defined percentage. For example, an array of tubes that prevent photon leakage between the tubes permits less than 10% of the photons entering that tube (i.e., the original tube) with an energy of greater than 100 keV to propagate into any of the other tubes in the array that are adjacent to the original tube.

Figure 1:
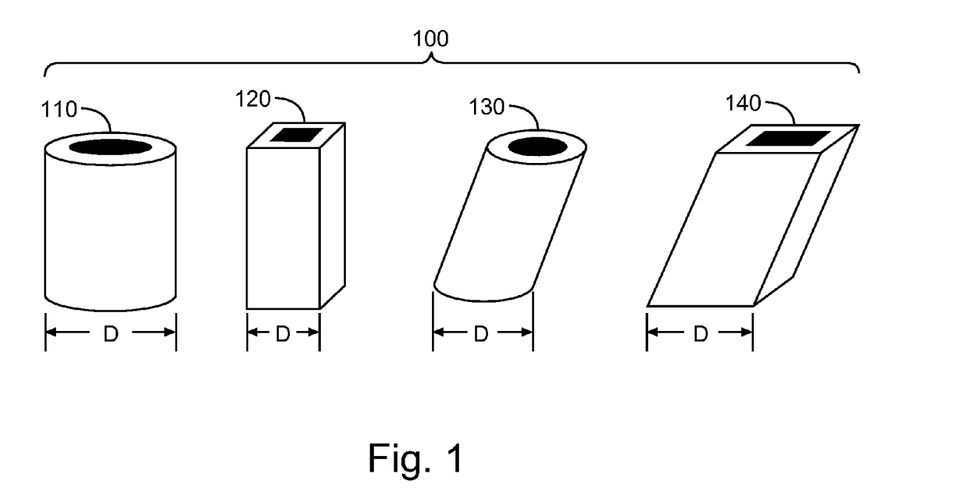
FIG. 1 is a perspective view of a variety of collimating elements, comprising tubes, according to various embodiments of the invention.

FIG. 1 is a perspective view of a variety of collimating elements 100, comprising tubes 110, 120, 130, 140, according to various embodiments of the invention. As shown in FIG. 1, the element 100 may take a variety of forms, including a cylindrical tube 110, a square conduit tube 120, an angled cylindrical tube 130, and an angled, rectangular conduit tube 140. Many other variations are possible; the examples are limited herein in the interest of brevity.

Thus, the elements 100 may be fabricated in a variety of shapes, including round, square, rectangular, oval, and multi-sided shapes with three, five, or more sides (the latter two types are not shown in the figure). Different dimensions, including different diameters, wall thicknesses, and angles may be used. The materials used to fabricate the elements 100 often have a high atomic number and density (e.g., >10 g/cc). Such materials include metals, such as tungsten (W), lead (Pb), and Molybdenum (Mo). Depending on the incident photon energy, the thickness T of the tubing wall is chosen to avoid leakage of photons from one tube to its neighboring tubes (e.g., see adjacent tubes grouped together to form a portion of a collimator in FIG. 2).

To determine the tubing wall thickness T, the formula $$A = A_0 e^{-\mu T}$$

can be used, where A is the attenuated flux, $A_0$ is the incident flux, $\mu$ is the attenuation coefficient, and T is the wall thickness of the tube—in accordance with the Beer-Lambert law. Those of ordinary skill in the art are aware that the value of the attenuation coefficient $\mu$ can be determined based on the density and elemental composition of the material chosen for the tube, and the expected energy of incident photons.

In some embodiments, the diameter of the tubing D is chosen to approximately match the pixel size of the position sensitive detector and maximize the amount of photons to strike the pixel detector. An angled form of the tubing element 100 (e.g., tubes 130, 140) can be useful when the incident photon beam is not perpendicular to the detector plane. Once the tube material, tube shape, tube diameter, tube wall thickness, tube length, and tube angle are determined, the number of tubes can be ordered from a manufacturer of material products, such as American Elements of Los Angeles, Calif.

Figure 2:
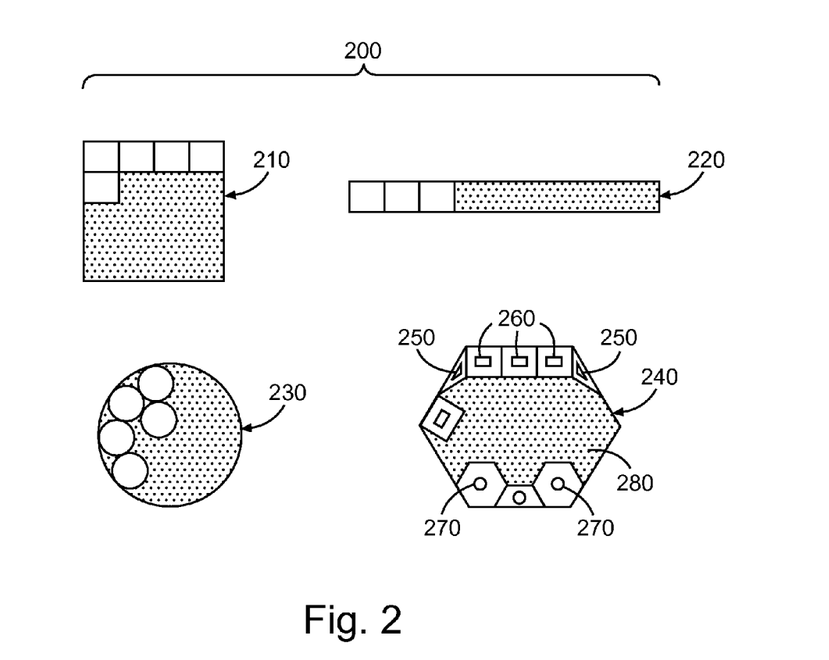
FIG. 2 is a top plan view of grouping shapes for collimators formed according to various embodiments of the invention.

FIG. 2 is a top plan view of grouping shapes for collimators 200 formed according to various embodiments of the invention. Here it can be seen how tubing of different shapes can be accommodated into groups, to build a complete collimator 210, 220, 230, 240. Thus, tubing of practically any shape, such as the cylindrical tube 110, or square conduit tube 120 of FIG. 1, can be assembled into a collimator to match a detector that is square, rectangular, circular, or multi-sided, as shown by the tubing arrangements associated with the collimators 210, 220, 230, 240, respectively. Tubing shapes can even be mixed within a single collimator assembly (e.g., the triangular, square, or hexagonal tubing 250, 260, 270, respectively) to fill out certain detector shapes (e.g., the hexagonal detector 280), if desired.

Figure 3:
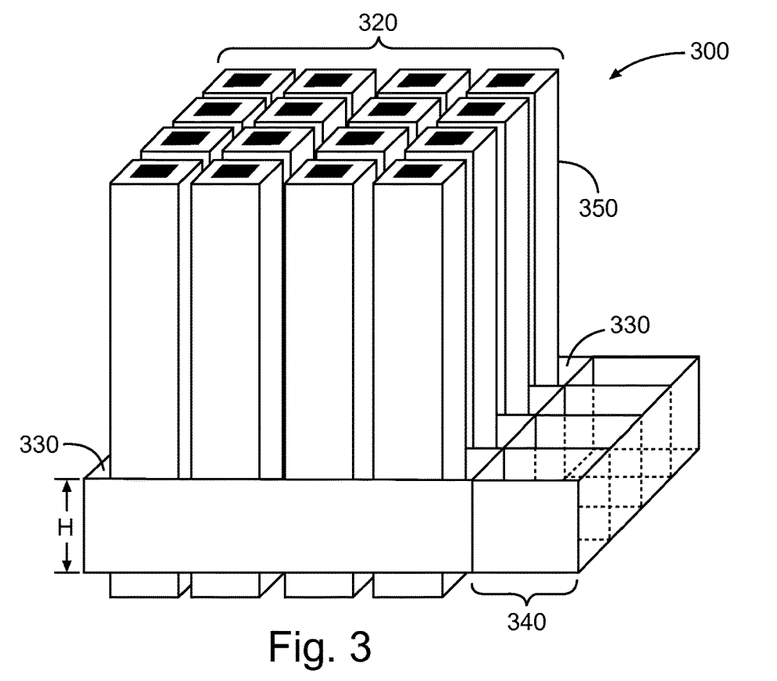
FIG. 3 is a perspective view of a collimator that includes a modular frame, according to various embodiments of the invention.

FIG. 3 is a perspective view of a collimator 300 that includes a modular frame 310, according to various embodiments of the invention. Here a set of square conduit tubes 320 have been bonded together, into a custom-made module, via adhesive and the frame 310. This collimator 300 is designed to match a pixelated detector having a square shape (not shown in the figure, but see the detector 410 in FIG. 4 as an example).

The collimator 300 may be fabricated as follows. A frame 310 is constructed from plastic (e.g., additive manufacturing) or paper (e.g., laser cutting). The frame 310 may be constructed to include a number and arrangement of cells 330 (e.g., the locations where the adhesive can be deposited) that match the pixels of the detector. In some embodiments, the diameter or width of a detector pixel is about the same as the outer diameter or width of the outer dimension of a single tube in the collimator 300. The height H of frame 310 may be set at about 5% of the tube 350 length. One end 340 of the frame may be extended away from the assembly to provide additional length, for handling convenience.

Once the frame 310 is populated with tubes 320, adhesive may be added to fix the assembly shape and glue the tubes 320 together. In some embodiments, a radiation-hard adhesive may be used, such as 3M 9882 or DP190EG adhesives, available from the 3M Company of St. Paul, Minn. Once the adhesive has cured, the group of collimator tubes 320 can be handled as a group, together with, or separated from the frame 310.

In some embodiments, individual tubes, groups of tubes, and/or collimators are fabricated using additive manufacturing techniques. Thus, the construction of a separate frame 310 may be unnecessary in some embodiments.

Figure 4:
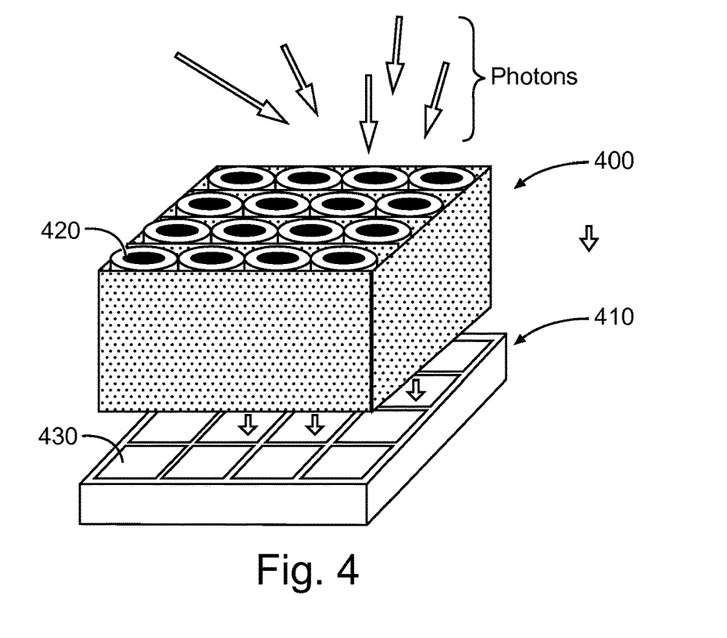
FIG. 4 is a perspective view of a collimator and detector, according to various embodiments of the invention.

FIG. 4 is a perspective view of a collimator 400 and detector 410, according to various embodiments of the invention. In this case the detector 410 is a two-dimensional area detector. As shown, the collimator 400 and the detector 410 match collimator tube elements 420 with pixels 430 in a 1:1 ratio. In some embodiments, there are multiple tube elements 420 matched to each pixel 430. In some embodiments, there are single tube elements 420 matched to multiple pixels 430.

Figure 5:
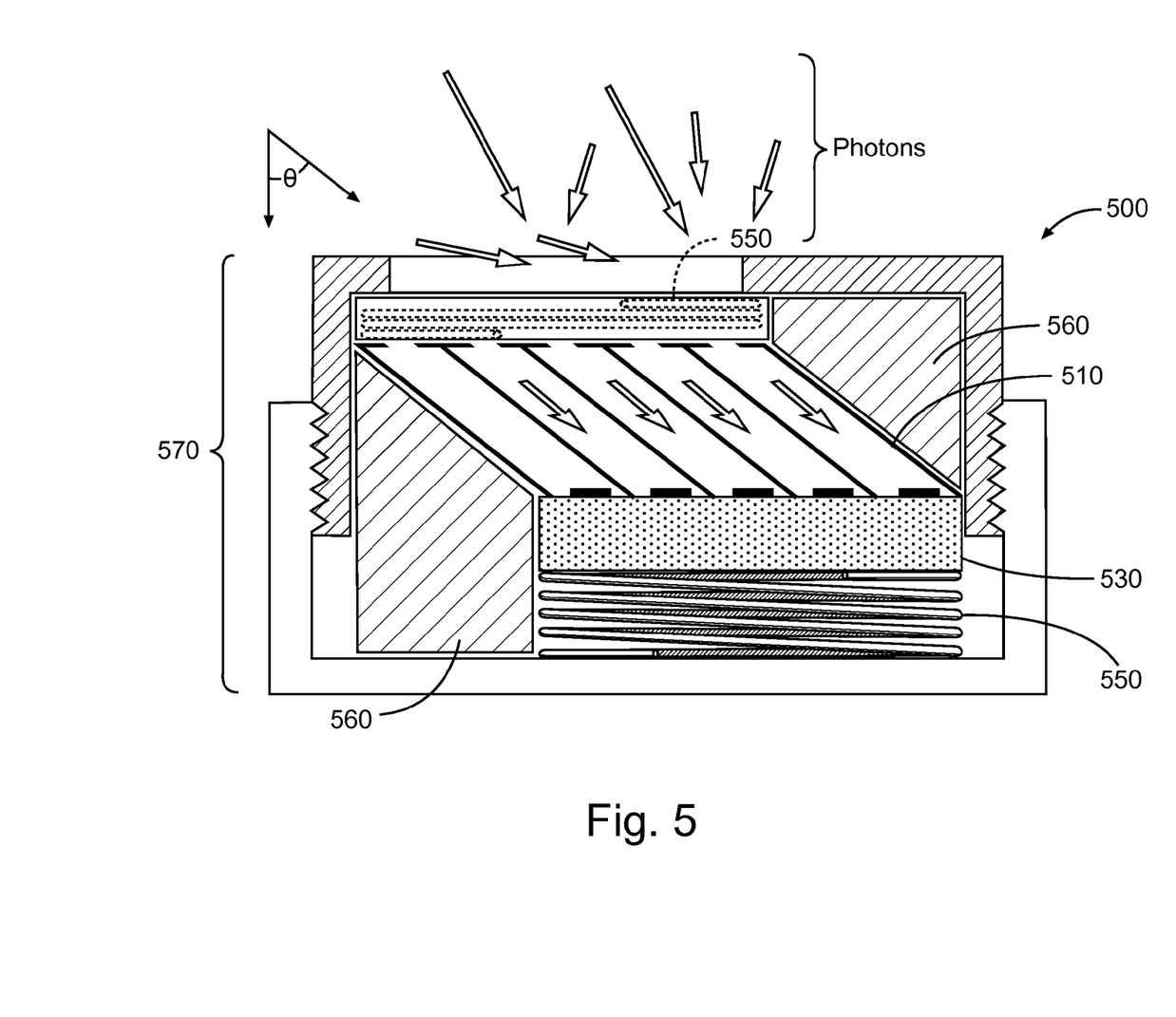
FIG. 5 is a sectioned side, cut-away view of an angled collimator and detector assembly, according to various embodiments of the invention.

FIG. 5 is a sectioned side, cut-away view of an angled collimator and detector assembly 500, according to various embodiments of the invention. Here an angled collimator 510 is formed from a group of tubes, to direct photons impinging generally at an angle θ toward a linear position sensitive photon detector 520. The collimator 510 can be coupled to the detector 520 using a threaded case 570. In some embodiments, a spring 550 is used to urge the collimator 510 into direct contact with the detector 520. Mechanical supporting elements 560 may be inserted as desired, to adapt the shape of the collimator-detector combination to the shape of the case 570. Still further embodiments may be realized.

Figure 6:
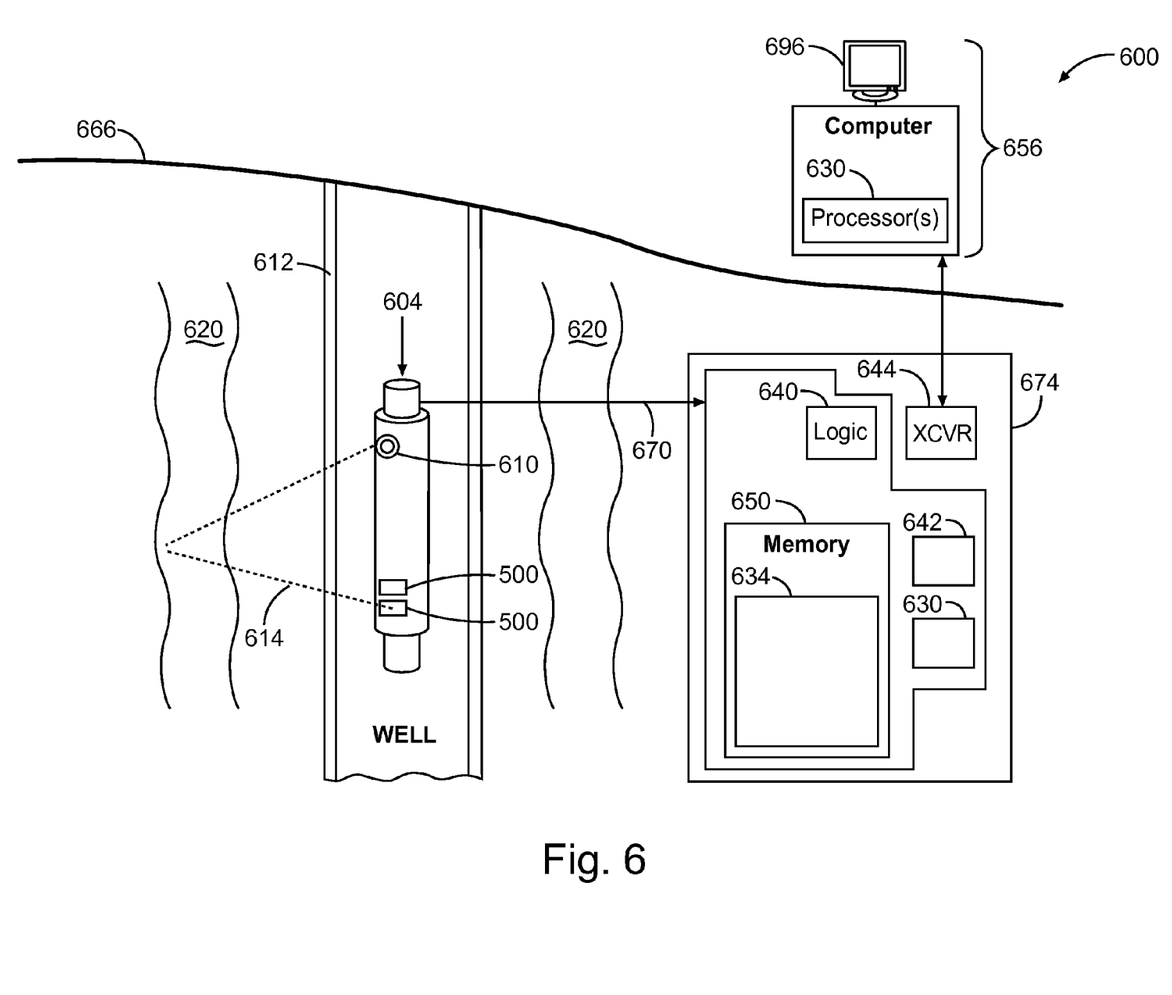
FIG. 6 is a block diagram of apparatus and systems according to various embodiments of the invention.

For example, FIG. 6 is a block diagram of apparatus 500 and systems 600 according to various embodiments of the invention. In some embodiments, a system 600 includes a housing 604. The housing 604 might take the form of a wireline tool body, or a downhole drilling tool. Processor(s) 630 within the system 600 may be located at the surface 666, as part of a surface logging facility 656, or in a data acquisition system 674, which may be above or below the Earth's surface 666 (e.g., attached to the housing 604). The apparatus 500 may take a number of forms, including the angled version shown in FIG. 5, or a more direct collimation-transmission arrangement, as is shown for the collimator-detector combination 400, 410 shown in FIG. 4.

A system 600 may further comprise a data transceiver 644 (e.g., a telemetry transmitter and/or receiver) to transmit acquired data 670 to a surface logging facility 656. The data 670 may comprise image information, such as the magnitude of individual energy signals captured by position-sensitive elements in the apparatus 500 resulting from an energy source 610 that transmits energy (e.g., X-rays) into a formation 620, which is reflected to form energy 614 that takes the form of photons and impinges on the apparatus 500. Logic 640 can be used to acquire the data 670 as signals, according to the various methods described herein. The acquired data 670, as well as other data, can be stored in the memory 650, perhaps as part of a database 634. The processors 630 can be used to process the data 670 to form images of cement 612 surrounding a well, or the formation 620 itself.

Thus, referring to FIGS. 1-6, it can be seen that many embodiments may be realized. For example, an apparatus 500 may comprise a position-sensitive detector 410, 530 divided into an array of pixels, and a collimator 400, 510 comprising an array of tubes, wherein individual ones 420 of the array of tubes maintain a fixed mechanical arrangement with individual ones 430 of the array of pixels, to provide collimation of photons from a first end of the tubes to a second end of the tubes coupled to the position-sensitive detector 410, 530.

The tubes may be formed with planar or curved surfaces, including outer surfaces, inner surfaces, or both. Thus, in some embodiments, one of outer surfaces of the tubes 420 or inner surfaces of the tubes 420 are planar or curved.

The tubes can operate to collimate photons in a 1:1 relationship between tubes and pixels; or a 1:many relationship, so that one tube collimates photons for multiple pixels; or a many:1 relationship, so that many tubes collimate photons for one pixel. Thus, in some embodiments, the array of tubes (e.g., in collimator 400) comprises no more than one tube per pixel in the array of pixels (e.g., in detector 410).

The tubes can be maintained in perpendicular relationship with the plane of the detector. Thus, in some embodiments, the mechanical arrangement comprises a longitudinal axis of tubes in the array of tubes being maintained in a substantially perpendicular orientation to a plane comprising the pixels in the array of pixels. This is particularly apparent in FIG. 4, where the array of tubes forming the collimator 400 is substantially aligned in a vertical direction that is substantially perpendicular to the plane comprising the pixels making up an array of pixels in the detector 410.

The tubes can be maintained in non-perpendicular relationship with the plane of the detector. Thus, in some embodiments, the mechanical arrangement comprises a longitudinal axis of tubes in the array of tubes being maintained in a substantially acute orientation to a plane comprising the pixels in the array of pixels. This is particularly apparent in FIG. 5, where the array of tubes forming the collimator 510 is substantially aligned in a direction that is not perpendicular to the plane comprising the pixels making up an array of pixels in the detector 530. In this case, an angle θ (not equal to 90 degrees) is formed between the array of tubes in the collimator and the array of pixels in the plane of the detector 530.

The tubes can be formed in a variety of shapes. Thus, in some embodiments, individual ones of the tubes have a shape selected from one of a cylinder, an oval, a hexagon, or a rectangle (e.g., see tubes 110, 130, 270, 140).

The array of tubes can be molded, machined from a single block of material, or printed in three-dimensions, using additive manufacturing techniques. In these cases, the exterior of the tubes may be formed a unitary whole, and the central portion of the tubes (i.e., the hollow portion) opened to permit photons to impinge on the pixels of a detector. Thus, in some embodiments, the array of tubes is formed as an integral assembly.

As noted previously, tubes can also be formed individually, and bonded to other tubes to form an array of tubes. Thus, in some embodiments, the array of tubes is formed from individual ones of the tubes in the array of tubes bound together with an adhesive.

In most embodiments, the tubes will be made of relatively dense material. Thus, the tubes in the array of tubes are often formed from a material having a density of at least 10 grams/cc.

The tubes can be made of a variety of materials. Thus, in some embodiments, the material used to form tubes comprises at least one of lead (Pb), molybdenum (Mo), or Tungsten (W).

In some embodiments, a system may be formed by combining the basic collimator-detector apparatus 500 with a source of energy, and a housing.

For example, in some embodiments, a system 600 may comprise a source of photons 610, one or more of the apparatus 500 described previously, as well as a housing 604 to contain at least one of the source of photons or the detector (in the apparatus 500). The housing 604, as will be explained in more detail below, may comprise one of a wireline tool or a drilling tool.

A threaded case may be used to couple the collimator to the detector. Thus, in some embodiments, the detector 530 is mechanically coupled to the collimator 510 with a threaded case 570.

A spring-loaded case may be used to couple the collimator to the detector. Thus, in some embodiments, the detector 530 is mechanically coupled to the collimator 510 with a spring-loaded case (e.g., the combination of the spring 550 and the case 570). As shown in the figure, one or more springs 550 may be disposed within the case 570, proximate to the detector 530, the collimator 510, or both.

The energy source may provide X-rays or gamma rays. Thus, in some embodiments, the source 610 of photons comprises one of an X-ray source or a gamma-ray source.

The system 600 may include a detection circuit, such that a processor can execute a program directing the processor to operate the photon source and to receive signals provided by the detection circuit. The received signals may be processed to produce downhole images. Thus, the system 600 may comprise a detection circuit (e.g., forming part of the logic 640) to detect an electrical signal generated by the detector in the apparatus 500 in response to receiving at least a portion of the photons at the array of pixels, as directed thereto by the collimator in the apparatus 500.

The wall thickness of the tubes can be selected according to the level of energy that is expected from the source. Thus, in some embodiments, the wall thickness of the tubes is sufficient to prevent photon leakage from a first one of the tubes to a second one of the tubes, when the photons have less than a predetermined energy level.

In some embodiments, the system 600 may comprise one or more processors 630 to operate various components in the system 600, and to process data 670 (e.g., signals provided by the detector(s) in one or more apparatus 500) acquired therefrom. Thus, a system 600 may comprise a processor 630 coupled to a memory 650 including a program, wherein the program, when executed, operates to direct the processor 630 to operate the energy source 610 and to receive signals (e.g., taking the form of data 670, or raw electrical signals provided directly from the apparatus 500 to the logic 640).

The apparatus 500, system 600, and each of their elements may all be characterized as "modules" herein. Such modules may include hardware circuitry, and/or a processor and/or memory circuits, software program modules and objects, and/or firmware, and combinations thereof, as desired by the architect of the apparatus 500 and systems 600, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a formation imaging package, an energy detection and measurement package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 500 and systems 600 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, vehicles, geothermal tools, and smart transducer interface node telemetry systems, among others. Some embodiments include a number of methods.

Figure 7:
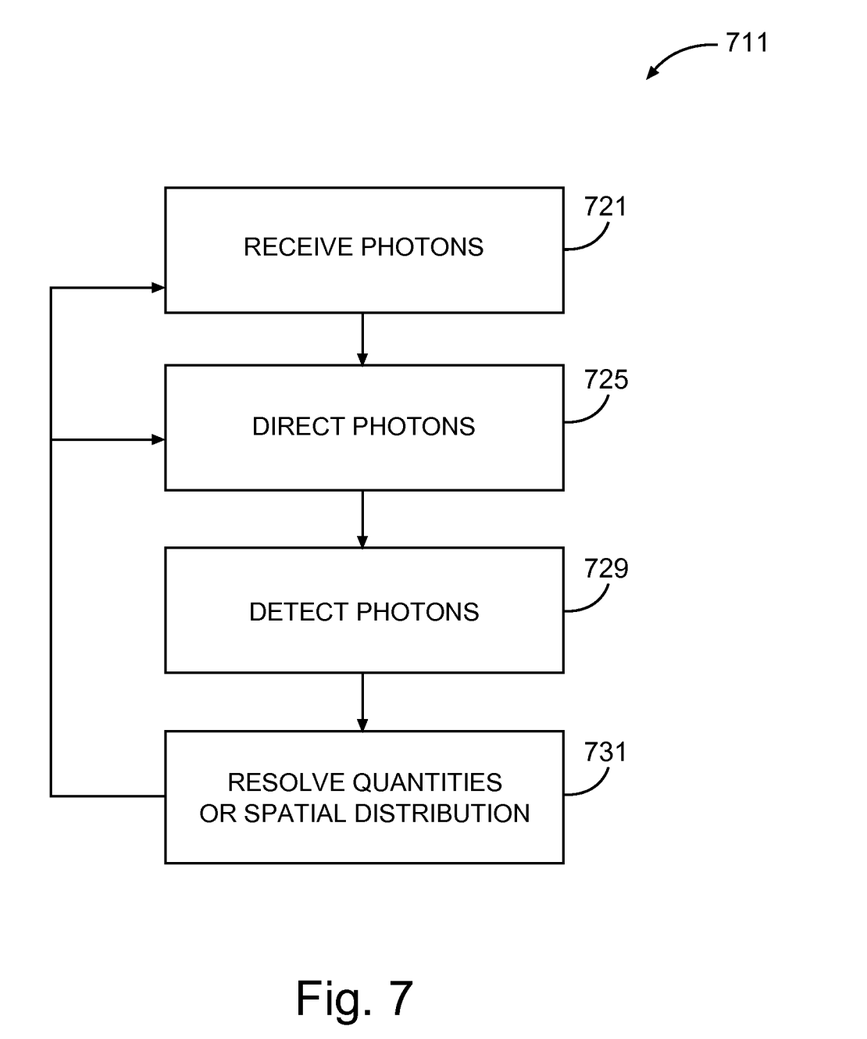
FIG. 7 is a flow chart illustrating several methods according to various embodiments of the invention.

FIG. 7 is a flow chart illustrating several methods 711 according to various embodiments of the invention. The methods 711 may comprise processor-implemented methods, to execute on one or more processors that perform the methods. For example, one embodiment of the methods 711 may begin at block 721 with receiving photons within an array of tubes, and directing the photons to a detector at block 725, with the array acting as a collimator of the photons.

In some embodiments, a method 711 may begin at block 721 with receiving photons at inner surfaces of an array of tubes forming a columnar structure, with the tubes having a material with substantially high density, wherein longitudinal axes of the tubes are substantially parallel.

In some embodiments, the method 711 may include, at block 725, directing the photons within the columnar structure to a position-sensitive detector to measure the photons. In some embodiments, the position-sensitive detector is divided into an array of pixels, and individual ones of the tubes in the array of tubes maintain a fixed mechanical arrangement with individual ones of the array of pixels, to provide collimation of the photons from a first end of the tubes to a second end of the tubes coupled to the position-sensitive detector.

The detector can be used to provide images. Thus, in some embodiments, the method 711 may continue on to block 729 to include detecting the photons by measuring one of light or an electrical signal provided by the detector.

The photons can provide an image of the environment surrounding the detector. Thus, in some embodiments, the method 711 may continue on to block 731 to include resolving the quantity or the spatial distribution of the photons at the detector. In some embodiments, the method 711 may continue from block 731 to return to one or both of blocks 721 and 725 to repeat the activities designated therein, as well as in the other blocks of the method 711.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIG. 7) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein.

For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 8:
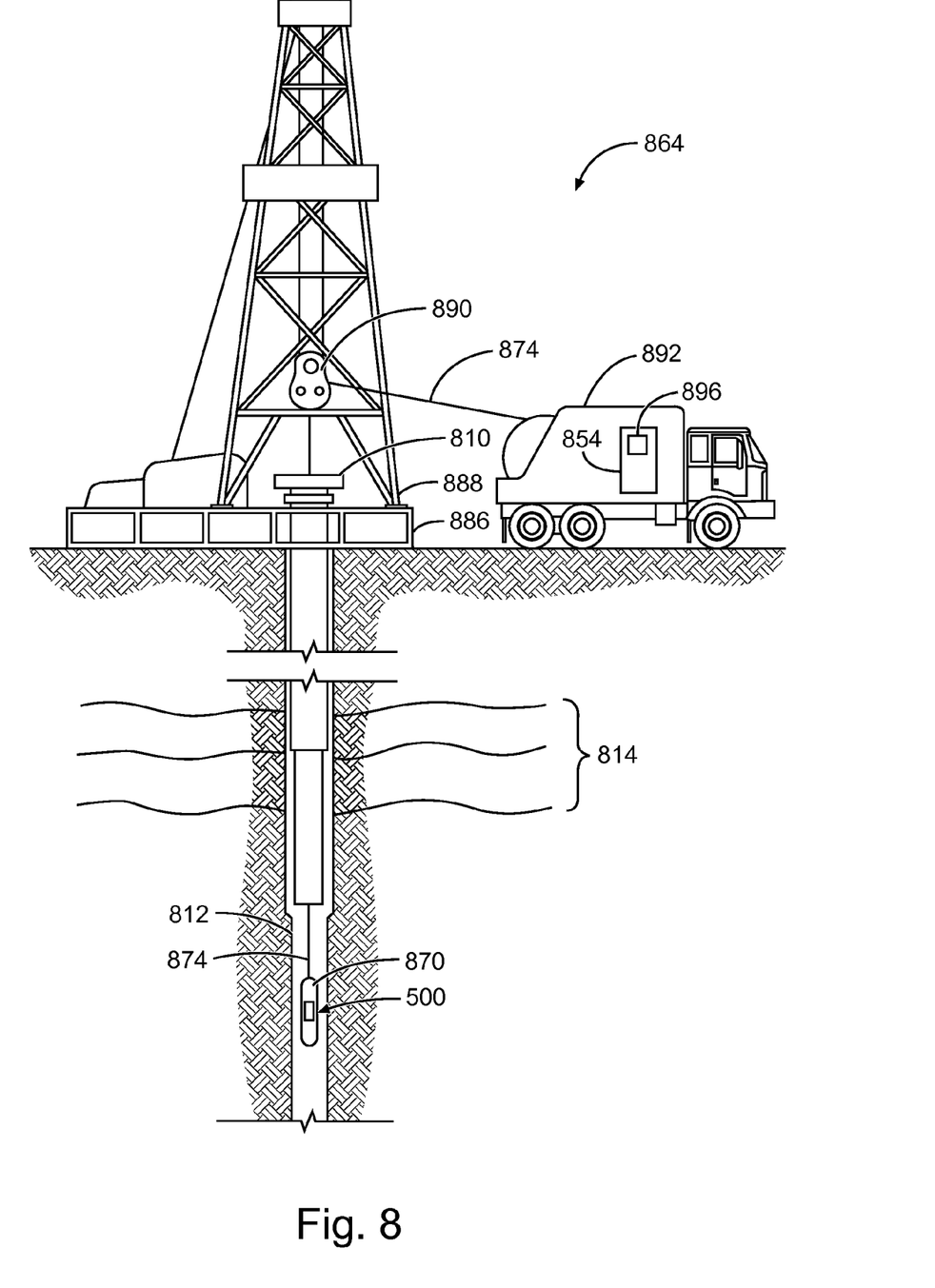
FIG. 8 illustrates a wireline system, according to various embodiments of the invention.
Figure 9:
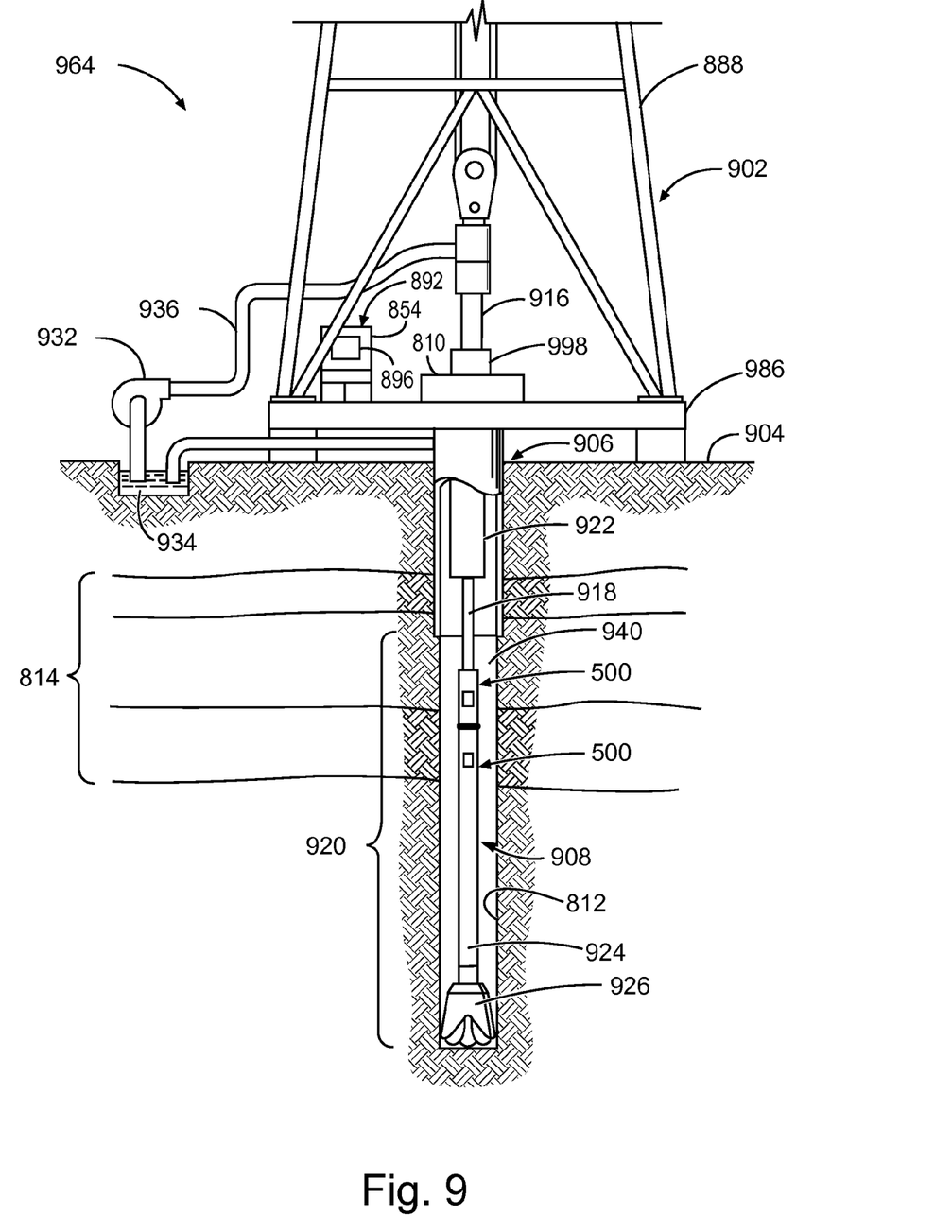
FIG. 9 illustrates a drilling rig system, according to various embodiments of the invention.

For example, FIG. 8 illustrates a wireline system 864 according to various embodiments of the invention. FIG. 9 illustrates a drilling rig system 964 according to various embodiments. Therefore, the systems 864, 964 may comprise portions of a wireline logging tool body 870 as part of a wireline logging operation, or of a downhole tool 924 as part of a downhole drilling operation. The systems 864 and 964 may include any one or more elements of the apparatus 500 and systems 600 shown in FIGS. 1-6.

Thus, FIG. 8 shows a well during wireline logging operations. In this case, a drilling platform 886 is equipped with a derrick 888 that supports a hoist 890.

Drilling oil and gas wells is commonly carried out using a string of drill pipes connected together so as to form a drilling string that is lowered through a rotary table 810 into a wellbore or borehole 812. Here it is assumed that the drilling string has been temporarily removed from the borehole 812 to allow a wireline logging tool body 870, such as a probe or sonde, to be lowered by wireline or logging cable 874 into the borehole 812. Typically, the wireline logging tool body 870 is lowered to the bottom of the region of interest and subsequently pulled upward at a substantially constant speed.

During the upward trip, at a series of depths, various instruments included in the tool body 870 may be used to perform measurements (e.g., made by the apparatus 500 shown in FIGS. 5-6) on the subsurface geological formations 814 adjacent the borehole 812 (and the tool body 870). The borehole 812 may represent one or more offset wells, or a target well.

The measurement data can be communicated to a surface logging facility 892 for processing, analysis, and/or storage. The logging facility 892 may be provided with electronic equipment for various types of signal processing, which may be implemented by any one or more of the components of the system 600 in FIG. 6. Similar formation evaluation data may be gathered and analyzed during drilling operations (e.g., during logging while drilling operations, and by extension, sampling while drilling).

In some embodiments, the tool body 870 is suspended in the wellbore by a wireline cable 874 that connects the tool to a surface control unit (e.g., comprising a workstation 854). The tool may be deployed in the borehole 812 on coiled tubing, jointed drill pipe, hard wired drill pipe, or any other suitable deployment technique.

Turning now to FIG. 9, it can be seen how a system 964 may also form a portion of a drilling rig 902 located at the surface 904 of a well 906. The drilling rig 902 may provide support for a drill string 908. The drill string 908 may operate to penetrate the rotary table 810 for drilling the borehole 812 through the subsurface formations 814. The drill string 908 may include a Kelly 916, drill pipe 918, and a bottom hole assembly 920, perhaps located at the lower portion of the drill pipe 918.

The bottom hole assembly 920 may include drill collars 922, a downhole tool 924, and a drill bit 926. The drill bit 926 may operate to create the borehole 812 by penetrating the surface 904 and the subsurface formations 814. The downhole tool 924 may comprise any of a number of different types of tools including measurement while drilling tools, logging while drilling tools, and others.

During drilling operations, the drill string 908 (perhaps including the Kelly 916, the drill pipe 918, and the bottom hole assembly 920) may be rotated by the rotary table 810. Although not shown, in addition to, or alternatively, the bottom hole assembly 920 may also be rotated by a motor (e.g., a mud motor) that is located downhole. The drill collars 922 may be used to add weight to the drill bit 926. The drill collars 922 may also operate to stiffen the bottom hole assembly 920, allowing the bottom hole assembly 920 to transfer the added weight to the drill bit 926, and in turn, to assist the drill bit 926 in penetrating the surface 904 and subsurface formations 814.

During drilling operations, a mud pump 932 may pump drilling fluid (sometimes known by those of ordinary skill in the art as "drilling mud") from a mud pit 934 through a hose 936 into the drill pipe 918 and down to the drill bit 926. The drilling fluid can flow out from the drill bit 926 and be returned to the surface 904 through an annular area between the drill pipe 918 and the sides of the borehole 812. The drilling fluid may then be returned to the mud pit 934, where such fluid is filtered. In some embodiments, the drilling fluid can be used to cool the drill bit 926, as well as to provide lubrication for the drill bit 926 during drilling operations. Additionally, the drilling fluid may be used to remove subsurface formation cuttings created by operating the drill bit 926.

Thus, referring now to FIGS. 1-6 and 8-9, it may be seen that in some embodiments, the systems 864, 964 may include a drill collar 922, a downhole tool 924, and/or a wireline logging tool body 870 to house one or more apparatus 500, similar to or identical to the apparatus 500 described above and illustrated in FIGS. 5-6. Any and all components of the system 600 in FIG. 6 may also be housed by the tool 924 or the tool body 870.

The tool 924 may comprise a downhole tool, such as a logging while drilling (LWD) tool or a measurement while drilling (MWD) tool. The wireline tool body 870 may comprise a wireline logging tool, including a probe or sonde, for example, coupled to a logging cable 874. Many embodiments may thus be realized. For example, in some embodiments, a system 864, 964 may include a display 896 to present X-ray image data in a well, perhaps in graphic form. Formation and/or cement density and structure may also be displayed.

In summary, the apparatus, systems, and methods disclosed herein make use of an easily fabricated collimator coupled to a photon detector that enables the geometry and material of individual tubes to be chosen, accounting for the expected photon energy, desired counting ability, statistical error tolerance, etc. The collimator is easy to assemble in many embodiments, taking a variety of shapes to match a specific position-sensitive area detector shape. This type of collimator construction provides great flexibility, at relatively low cost. As a result, the value of services provided by an operation/exploration company may be significantly enhanced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a position-sensitive detector divided into an array of pixels; and
   a collimator comprising an array of tubes to provide collimation of photons from a first end of the array of tubes to a second end of the array of tubes coupled to the position-sensitive detector, wherein individual tubes of the array of tubes maintain a fixed mechanical arrangement with individual pixels of the array of pixels, and wherein a first tube of the array of tubes and a second tube of the array of tubes have non-similar shapes.

2. The apparatus of claim 1, wherein at least one of outer surfaces of the array of tubes or inner surface of the array of tubes are planar or curved.

3. The apparatus of claim 1, wherein each tube of the array of tubes and pixels of the position-sensitive detector maintain a 1:1 or a 1: many relationship to provide the collimation of photons.

4. The apparatus of claim 1, wherein the fixed mechanical arrangement comprises a longitudinal axis of at least one tube in the array of tubes being maintained in a substantially perpendicular orientation to a plane comprising pixels in the array of pixels.

5. The apparatus of claim 1, wherein the fixed mechanical arrangement comprises a longitudinal axis of at least one tube in the array of tubes being maintained in a substantially acute orientation to a plane comprising pixels in the array of pixels.

6. The apparatus of claim 1, wherein the individual tubes of the array of tubes have a shape selected from one of a triangle, a circle, a trapezoid, an oval, a hexagon, or a rectangle.

7. The apparatus of claim 1, wherein the array of tubes is formed as an integral assembly.

8. The apparatus of claim 1, wherein the array of tubes is formed from individual tubes in the array of tubes bound together with an adhesive.

9. The apparatus of claim 1, wherein the array of tubes comprises a material having a density of at least 10 grams/cc.

10. The apparatus of claim 9, wherein the material comprises at least one of lead (Pb), molybdenum (Mo), or Tungsten (W).

11. The apparatus of claim 1, further comprising:
a spring disposed proximate to the collimator or the position-sensitive detector.

12. A system, comprising:
a source of photons;
a position-sensitive detector divided into an array of pixels;
a collimator comprising an array of tubes to provide collimation of photons from a first end of the array of tubes to a second end of the array of tubes coupled to the position-sensitive detector, wherein individual tubes of the array of tubes maintain a fixed mechanical arrangement with individual pixels of the array of pixels, and wherein a first tube of the array of tubes and a second tube of the array of tubes have non-similar shapes; and
a housing to contain at least one of the source of photons or the position-sensitive detector, the housing comprising one of a wireline tool or a drilling tool.

13. The system of claim 12, wherein the position-sensitive detector is mechanically coupled to the collimator with a threaded case.

14. The system of claim 12, wherein the position-sensitive detector is mechanically coupled to the collimator with a spring-loaded case.

15. The system of claim 12, wherein the source of photons comprises one of an X-ray source or a gamma-ray source.

16. The system of claim 12, further comprising:
a detection circuit to detect an electrical signal generated by the position-sensitive detector in response to receiving at least a portion of the photons at the array of pixels, as directed thereto by the collimator.

17. The system of claim 12, wherein a wall thickness of the array of tubes is sufficient to prevent photon leakage from the first tube of the array of tubes to the second tube of the array of tubes, when the photons have less than a predetermined energy level.

18. A method, comprising:
receiving photons at inner surfaces of an array of tubes forming a columnar structure, wherein the array of tubes have a material with substantially high density, wherein longitudinal axes of individual tubes in the array of tubes are substantially parallel; and directing the photons within the columnar structure to a position-sensitive detector to measure the photons to provide collimation of the photons from a first end of the array of tubes to a second end of the array of tubes coupled to the position-sensitive detector, wherein the position-sensitive detector is divided into an array of pixels, and wherein the individual tubes of the array of tubes maintain a fixed mechanical arrangement with individual pixels of the array of pixels, and wherein a first tube of the array of tubes and a second tube of the array of tubes have non-similar shapes.

19. The method of claim 18, further comprising:
detecting the photons by measuring one of light or an electrical signal provided by the position-sensitive detector.

20. The method of claim 18, further comprising:
resolving a quantity or a spatial distribution of the photons at the position-sensitive detector.

* * * * *